United States Patent
Basso et al.

(10) Patent No.: US 8,885,518 B2
(45) Date of Patent: *Nov. 11, 2014

(54) SYNCHRONIZING ROUTING TABLES IN A DISTRIBUTED NETWORK SWITCH

(71) Applicant: International Business Machines Corporation, Armonk, NY (US)

(72) Inventors: Claude Basso, Nice (FR); David A. Shedivy, Rochester, MN (US); Colin B. Verrilli, Apex, NC (US); Bruce M. Walk, Rochester, MN (US); Daniel Wind, Drap (FR)

(73) Assignee: International Business Machines Corporation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/687,873

(22) Filed: Nov. 28, 2012

(65) Prior Publication Data

US 2013/0195105 A1    Aug. 1, 2013

Related U.S. Application Data

(63) Continuation of application No. 13/363,434, filed on Feb. 1, 2012.

(51) Int. Cl.
*H04L 12/28*  (2006.01)
*H04L 12/751*  (2013.01)
*H04L 12/721*  (2013.01)

(52) U.S. Cl.
CPC .............. *H04L 45/72* (2013.01); *H04L 45/02* (2013.01)
USPC .......................................... 370/254; 370/255

(58) Field of Classification Search
CPC ......... H04L 41/12; H04L 45/02; H04L 45/00; H04L 45/04; H04L 41/04
USPC ................................. 370/254, 255, 229, 236
See application file for complete search history.

(56) References Cited

U.S. PATENT DOCUMENTS

| | | |
|---|---|---|
| 5,265,092 A | 11/1993 | Soloway et al. |
| 6,819,671 B1 | 11/2004 | Chen et al. |
| 7,007,100 B1 | 2/2006 | Doong et al. |
| 7,593,400 B2 | 9/2009 | Zelig et al. |
| 7,738,454 B1 | 6/2010 | Panwar et al. |
| 8,160,056 B2 | 4/2012 | Van der Merwe et al. |
| 2004/0133634 A1 | 7/2004 | Luke et al. |
| 2005/0220109 A1 | 10/2005 | Sudo et al. |

(Continued)

OTHER PUBLICATIONS

U.S. Appl. No. 13/363,434, entitled Synchronizing Routing Tables in a Distributed Network Switch, filed Feb. 1, 2012.

(Continued)

*Primary Examiner* — Hassan Phillips
*Assistant Examiner* — Siren Wei
(74) *Attorney, Agent, or Firm* — Patterson & Sheridan LLP

(57) ABSTRACT

Techniques are provided for routing table synchronization for a distributed network switch. In one embodiment, a first frame having a source address and a destination address is received. If no routing entry for the source address is found in a routing table of a first switch module, routing information is determined for the source address and a routing entry is generated. An indication is sent to a second switch module, to request a routing entry for the source address to be generated in the second switch module, based on the routing information.

20 Claims, 10 Drawing Sheets

(56) References Cited

U.S. PATENT DOCUMENTS

| | | |
|---|---|---|
| 2006/0018321 A1 | 1/2006 | Yamada et al. |
| 2006/0036765 A1 | 2/2006 | Weyman |
| 2006/0294211 A1 | 12/2006 | Amato |
| 2007/0183334 A1* | 8/2007 | White et al. ............. 370/238 |
| 2008/0062891 A1 | 3/2008 | Van der Merwe et al. |
| 2008/0069100 A1* | 3/2008 | Weyman et al. .......... 370/390 |
| 2008/0159144 A1* | 7/2008 | Nagarajan et al. ........ 370/235 |
| 2008/0239957 A1 | 10/2008 | Tokura et al. |
| 2008/0279188 A1 | 11/2008 | Alfieri et al. |
| 2008/0304497 A1* | 12/2008 | Viswanath et al. ........ 370/401 |
| 2009/0232139 A1 | 9/2009 | Kelley |
| 2009/0274044 A1 | 11/2009 | Goose et al. |
| 2010/0011028 A1 | 1/2010 | Dade |
| 2010/0020795 A1* | 1/2010 | Devarajan et al. ........ 370/389 |
| 2010/0245378 A1 | 9/2010 | Matsuura |
| 2010/0254377 A1 | 10/2010 | Akella et al. |
| 2010/0254378 A1 | 10/2010 | Akella et al. |
| 2011/0051837 A1 | 3/2011 | Park et al. |
| 2011/0261815 A1 | 10/2011 | Armstrong et al. |
| 2011/0280248 A1* | 11/2011 | Singh et al. .............. 370/401 |
| 2012/0257565 A1* | 10/2012 | Laroche et al. ........... 370/328 |
| 2013/0028258 A1 | 1/2013 | Carney et al. |
| 2013/0044645 A1 | 2/2013 | Castro Castro et al. |
| 2013/0058338 A1 | 3/2013 | Guttman et al. |
| 2013/0188640 A1 | 7/2013 | Cors et al. |
| 2013/0242985 A1 | 9/2013 | Basso et al. |
| 2013/0242986 A1 | 9/2013 | Basso et al. |
| 2013/0242988 A1 | 9/2013 | Basso et al. |
| 2014/0064092 A1 | 3/2014 | Basso et al. |

OTHER PUBLICATIONS

U.S. Patent Application entitled Multicast Miss Notification for a Distributed Network Switch, U.S. Appl. No. 13/353,737, filed Jan. 19, 2012.

U.S. Patent Application entitled Hashing-Based Routing Table Management, U.S. Appl. No. 13/597,386, filed Aug. 29, 2012.

U.S. Patent Application entitled Sliced Routing Table Management, U.S. Appl. No. 13/597,784, filed Aug. 29, 2012.

U.S. Patent Application entitled Sliced Routing Table Management With Replication, U.S. Appl. No. 13/597,807, filed Aug. 29, 2012.

U.S. Patent Application entitled Cached Routing Table Management, U.S. Appl. No. 13/597,636, filed Aug. 29, 2012.

U.S. Appl. No. 13/778,671, entitled Hashing-Based Routing Table Management, filed Feb. 27, 2013.

U.S. Appl. No. 13/778,400, entitled Sliced Routing Table Management, filed Feb. 27, 2013.

U.S. Appl. No. 13/778,417, entitled Cached Routing Table Management, filed Feb. 27, 2013.

U.S. Patent Application entitled Sliced Routing Table Management With Replication, U.S. Appl. No. 14/242,455, filed Apr. 1, 2014.

* cited by examiner

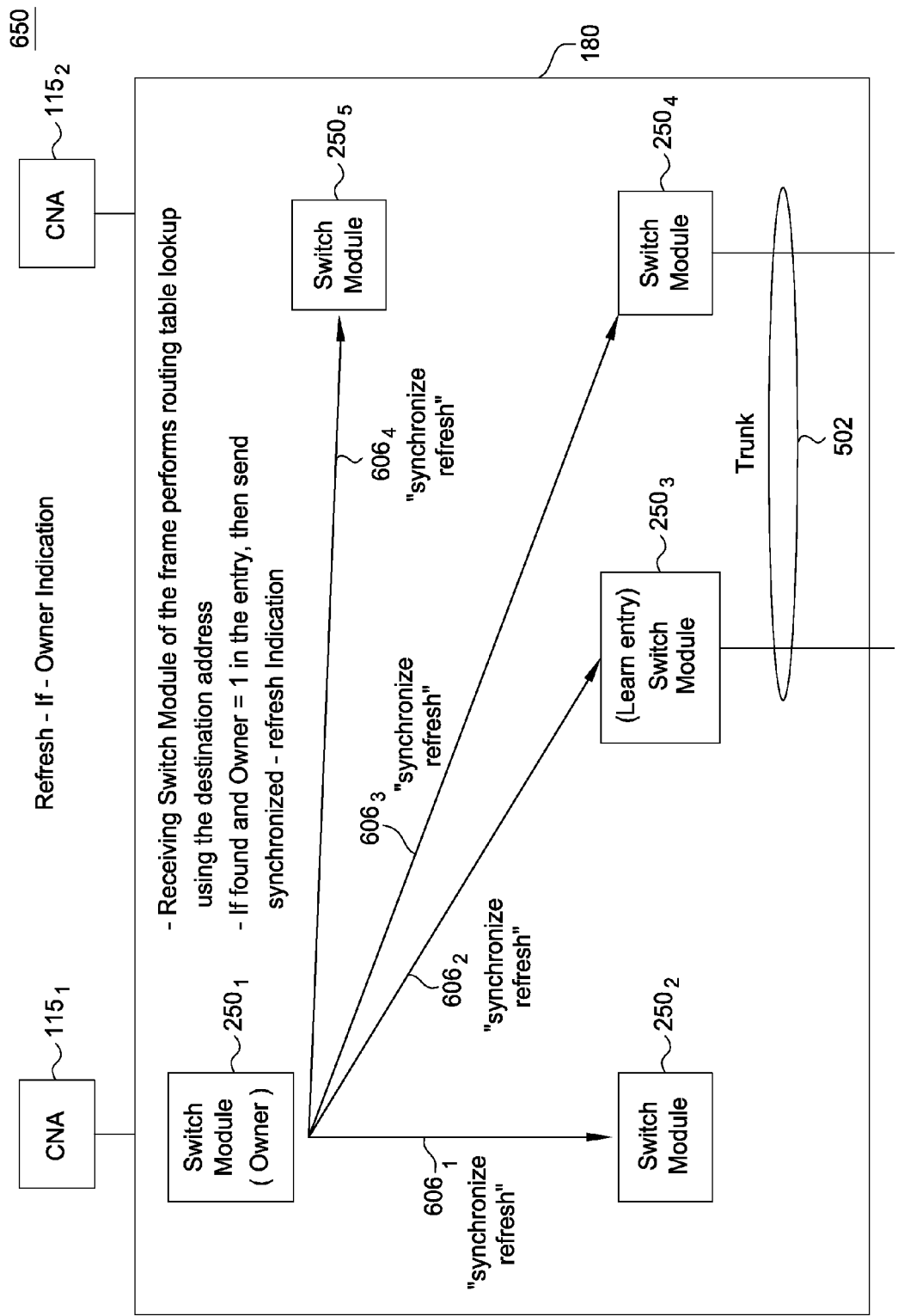

| Messages | Ethernet Header (18B) 0:17 | Control Op Type (2B) 18:19 | Bytes 20:23 | Bytes 24:31 | Bytes 32:59 | Bytes 60:63 |
|---|---|---|---|---|---|---|
| Sync Messages | | | | | | |
| -Immediate / Refresh | E-Hdr(18B) | 0x'0040' | Route Information "Enumerated as a 32b field" 31: Route Type (1b) 0=Unicast, 1-Trunk 30:19 Reserved (12b) Unicast Route Type (19b) 18:11 - Chip ID 10:7 - dVEB ID 6:4 - Physical Port 3:0 - Logical Port Trunk Route Type (19b) 18:9 - Reserved (10b) 8:0 - Trunk ID (9B) | FDB Entry Key LN(4b), VLAN(12b), MAC(48b) | Pad... | CRC/FCS |
| - Invalidate | E-Hdr(18B) | 0x'0041' | Reserved - 0's | FDB Entry Key LN(4b), VLAN(12b), MAC(48b) | Pad... | CRC/FCS |

SYNCHRONIZING ROUTING TABLES IN A DISTRIBUTED NETWORK SWITCH

CROSS-REFERENCE TO RELATED APPLICATIONS

This application is a continuation of co-pending U.S. patent application Ser. No. 13/363,434, filed Feb. 1, 2012. The aforementioned related patent application is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots as well as permit communication between servers in the same or different chassis.

Further, multiple switches may be combined to create a distributed network switch. However, the communication interface between the distributed network switch and the servers may become so busy that packets are dropped (or lost). That is, a server may transmit packets to a switch faster than the switch can process the received packets. If the buffer associated with the switch fills up, subsequent packets may be dropped. To avoid packet loss, a switch may instruct the server to temporarily stop sending packets to the switch. The switch may use this period of time to relieve network congestion.

SUMMARY

Embodiments of the invention provide a method, product and system for performing an operation for routing table synchronization in a distributed network switch that includes a first switch module and a second switch module. The operation includes receiving, by the first switch module, a first frame having a source address and a destination address. Each switch module includes multiple bridge elements and a routing table. Further, the routing table in each switch module is shared among the multiple bridge elements in the respective switch module. The operation also includes, upon determining that the routing table of the first switch module does not include a routing entry for the source address, determining routing information for the source address; generating the routing entry for the source address in the routing table of the first switch module, based on the routing information; and sending, to the second switch module, an indication to generate a corresponding entry in the routing table of the second switch module for the source address, based on the routing information.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 6A-6B are data flow diagrams illustrating a method for sending a refresh-if-owner indication as part of a preexisting frame, according to one embodiment of the invention.

FIG. 7 is a table showing example message formats for synchronization indications, according to one embodiment of the invention.

DETAILED DESCRIPTION

Figure 1:
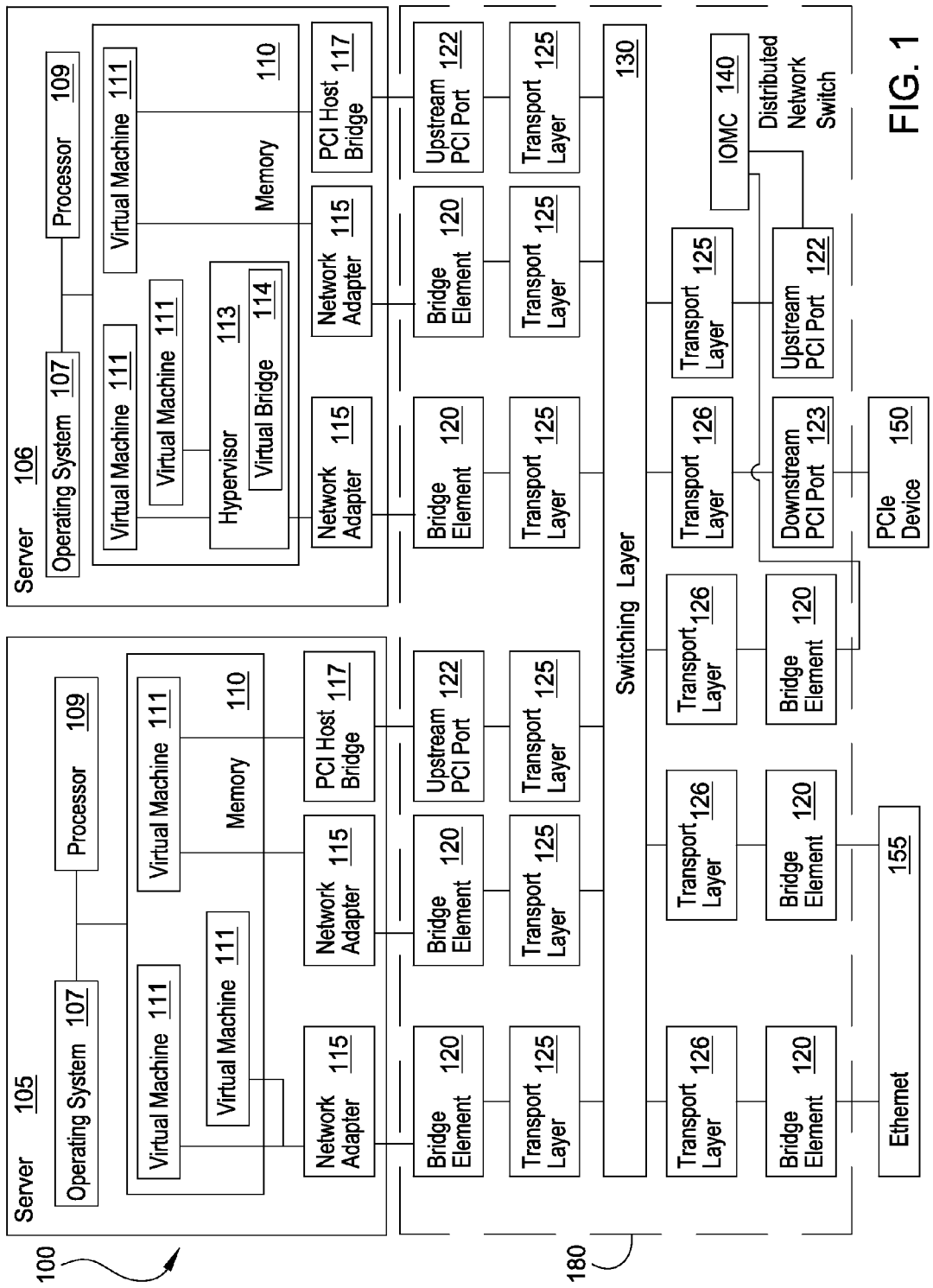
FIG. 1 illustrates a system architecture that includes a distributed network switch, according to one embodiment of the invention.

Embodiments of the invention provide techniques for routing table synchronization for a distributed network switch. One embodiment provides a first switch module configured to receive a first frame having a source address and a destination address. Upon determining that a routing entry for the source address does not exist in a routing table of the first switch module, the first switch module determines routing information for the source address and floods a broadcast domain of the first switch module with the frame. The first switch module then generates the routing entry for the source address in the routing table of the first switch module, based on the routing information. The first switch module then sends, to a second switch module, an indication to generate a routing entry for the source address in a routing table of the second switch module, based on the routing information. Accordingly, flooding frames in the distributed network switch may be reduced at least in some cases. For example, if the second switch module generates the routing entry by the time that the second switch module receives a response frame, the second switch module would not need to flood the broadcast domain of the second switch module with the response frame. Instead, the second switch module may send the response frame to the first switch module, based on the routing entry in the routing table of the second switch module.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 illustrates a system architecture that includes a distributed network switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect (LRI) which connects bridge elements 120 located within the same chassis and rack, as well as links that connect to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the distributed network switch 180.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members.

Figure 2:
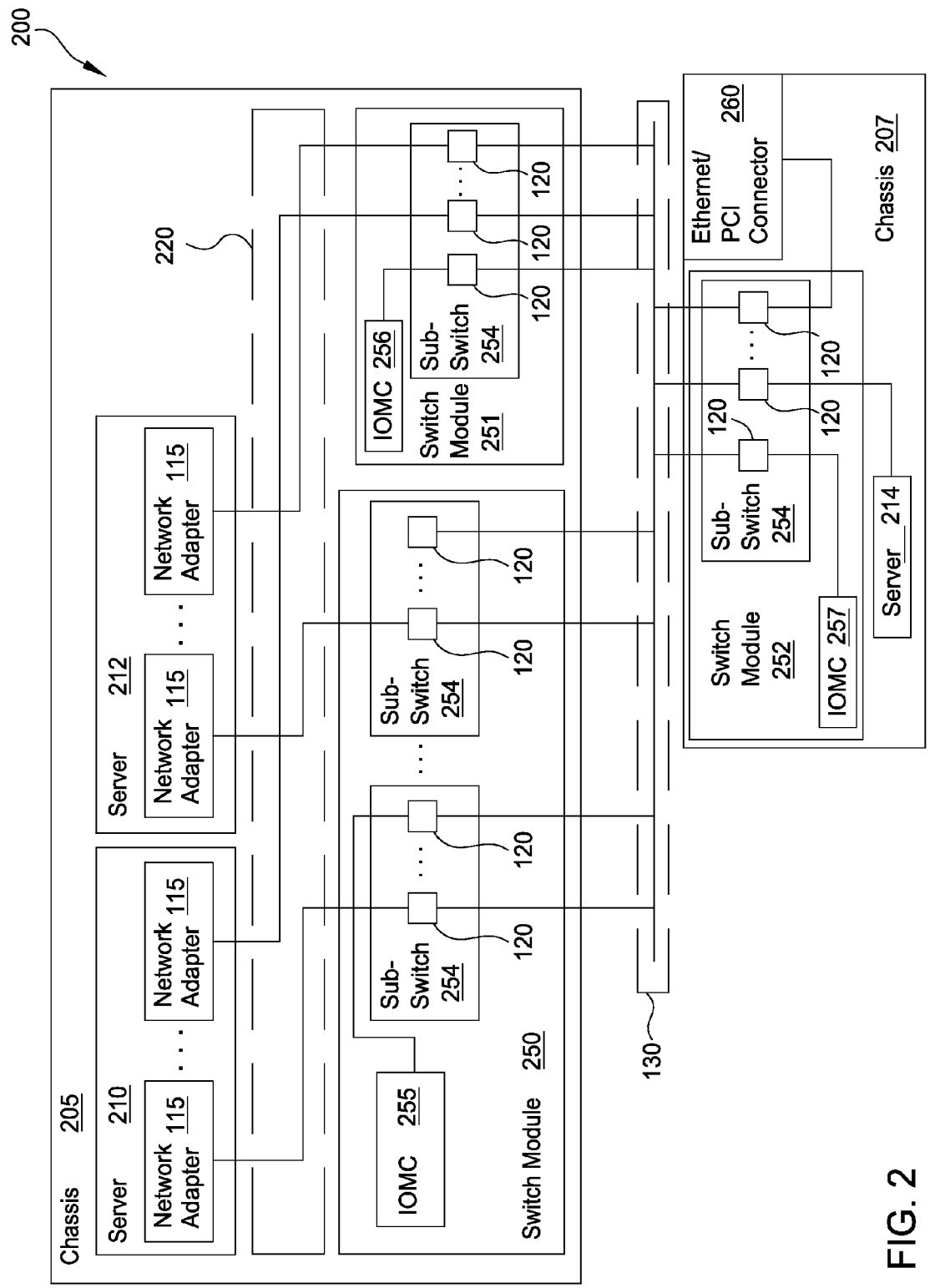
FIG. 2 illustrates the hardware representation of a system that implements a distributed network switch, according to one embodiment of the invention.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254. In one embodiment, the switch modules 250, 251, 252 are hardware components (e.g., PCB boards, FPGA boards, system on a chip, etc.) that provide physical support and connectivity between the network adapters 115 and the bridge elements 120. In general, the switch modules 250, 251, 252 include hardware that connects different chassis 205, 207 and servers 210, 212, 214 in the system 200.

The switch modules 250, 251, 252 (i.e., a chassis interconnect element) include one or more sub-switches 254 and an IOMC 255, 256, 257. The sub-switches 254 may include a logical or physical grouping of bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module.

The dotted line in chassis 205 defines the midplane 220 between the servers 210, 212 and the switch modules 250, 251. That is, the midplane 220 includes the data paths that transmit data between the network adapters 115 and the sub-switches 254.

Each bridge element 120 connects to the switching layer 130. In addition, a bridging element 120 may also connect to a network adapter 115 or an uplink. As used herein, an uplink port of a bridging element 120 provides a service that expands the connectivity or capabilities of the system 200. As shown in chassis 207, one bridging element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridging elements 120 to update the routing tables and lookup tables to include the hardware elements on the new switching module.

Figure 3:
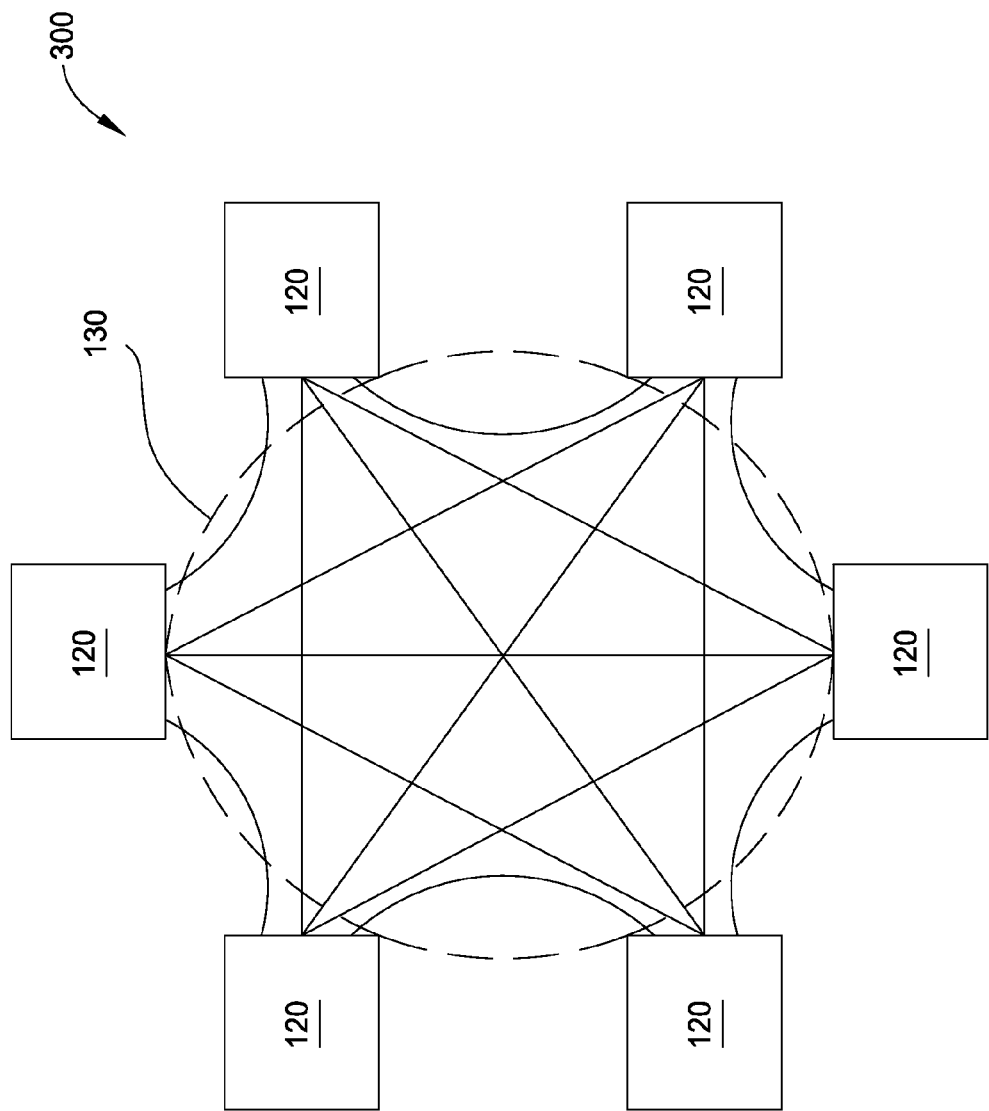
FIG. 3 illustrates a distributed network switch, according to one embodiment of the invention.

FIG. 3 illustrates a virtual switching layer, according to one embodiment of the invention. Each bridging element 120 in the systems 100 and 200 are connected to each other using the switching layer 130 via a mesh connection schema. That is, no matter the bridging element 120 used, a cell (i.e., data packet) can be routed to another other bridging element 120 located on any other switch module 250, 251, 252. This may be accomplished by directly connecting each bridging element 120—i.e., each bridging element 120 has a dedicated data path to every other bridging element 120. Alternatively, the switching layer 130 may use a spine-leaf architecture where each bridging element 120 (i.e., a leaf node) is attached to at least one spine node. The spine nodes route cells received from the bridging elements 120 to the correct spine node which then forwards the data to the correct bridging element 120. However, this invention is not limited to any particular technique for interconnecting the bridging elements 120.

Accordingly, the distributed network switch disclosed herein is configured to provide Layer 2 Ethernet switching via: multiple switch modules 250, 251, the LRI interconnecting the switch modules 250, 251, and management firmware executing on a management controller such as the IOMC 255, 256, 257. Doing so may eliminate the need for stand-alone Ethernet switches to interconnect processing elements in the servers 105, 106. At least in some embodiments, the networked system may also be augmented in a granular and/or scalable manner by adding individual components such as switch modules and/or processing elements.

In one embodiment, each switch module 250, 251 is operatively connected to multiple bridge elements. In a particular embodiment, each switch module is configured to use four bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 4:
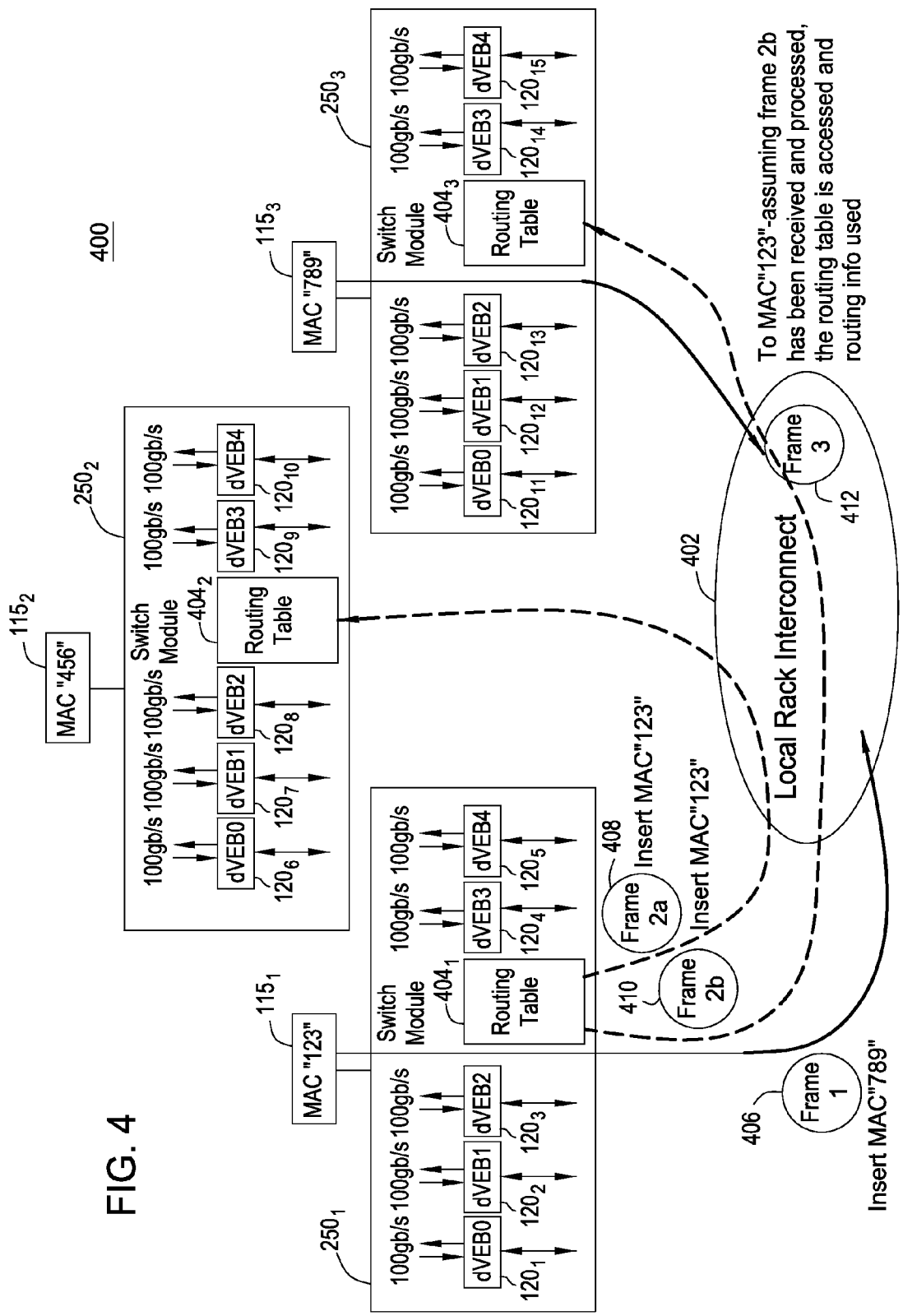
FIG. 4 is a block diagram depicting components of a system for synchronizing routing tables in a distributed network switch, according to one embodiment of the invention.

FIG. 4 is a block diagram depicting components 400 of a system for synchronizing routing tables in a distributed network switch, according to one embodiment of the invention. As shown, the components 400 include network adapters $115_{1-3}$, each operatively connected to a respective switch module $250_{1-3}$. In this particular example, the network adapters $115_{1-3}$ are associated with Media Access Control (MAC) addresses of "123", "456", and "789", respectively. Each switch module $250_{1-3}$ includes a plurality of bridge elements $120_{1-15}$, each of which is a dVEB in this particular example. Each switch module $250_{1-3}$ further includes a routing table $404_{1-3}$ that is shared among the bridge elements 120 of the respective switch module $250_{1-3}$. The switch modules $250_{1-3}$ are interconnected via an LRI 402. As used herein, a routing table may also be referred to as a forwarding database (FDB).

In one embodiment, to process a frame entering an ingress port of a switch module 250, the switch module 250 accesses its routing table 404 to determine routing information for processing the frame. To this end, the switch module 250 may perform a lookup of a source address and/or destination address specified in the frame. The switch module 250 may also send one or more synchronization indications to other switch modules in the distributed network switch, to facilitate creation of routing entries for the source address and/or destination address in one or more of the routing tables of the other switch modules. Accordingly, at least in some cases, the routing tables may be synchronized more efficiently relative to alternative embodiments involving flooding of frames by each switch module in the distributed network switch to generate network address. Consequently, the switching efficiency of the distributed network switch may also be improved at least in some cases.

For example, assume that the network adapter $115_1$ sends a frame to the network adapter $115_3$. The frame arrives at the ingress port of the bridge element $120_3$ of the switch module $250_1$. The bridge element $120_3$ performs a lookup of both the source address and the destination address of the frame, in the routing table $404_1$. Assume that the routing table $404_1$ includes a routing entry for the destination address but does not contain any routing entry for the source address. Accordingly, the switch module $250_1$ learns the source address. As used herein, learning a network address of a frame by a switch module refers to obtaining routing information for the network address from both configuration fields in the switch module and the physical port and logical port that the frame was received on. For example, the learning of the source address occurs in the source routing table whether the frame is flooded to the broadcast domain or routed directly to the destination switch module. If a frame is flooded to the broadcast domain, then the indication to learn the source address is seen by all switch modules in the broadcast domain, and those switch modules will insert an entry for the source address in their respective routing tables. If the frame is routed directly to the destination switch module, then only that switch module will learn the source address. In one embodiment, the routing entry includes both the source address and the routing information associated with the source address. The switch module $250_1$ then sends the frame (shown as frame 406) via the LRI 402 and via the bridge element $120_{12}$ of the switch module $250_3$ to the network adapter $115_3$.

In one embodiment, the bridge element $120_3$ of the switch module $250_1$ also generates synchronization indications to be sent to the other switch modules $250_{2-3}$. Different types of synchronization indications include, without limitation, synchronize-insert, refresh-if-owner, synchronize-refresh, and synchronize-invalidate. Depending on the embodiment, each indication may be sent as a standalone frame or as part of a pre-existing frame, i.e., frames of pre-existing network traffic. Frames of pre-existing traffic refer to frames that are intended to be sent, regardless of the presence or absence of the synchronization indications. Sending an indication as part of an existing frame may reduce the overhead of synchronizing the routing tables in some cases, at least in terms of network utilization.

In one embodiment, the synchronize-insert indication is sent by a first switch module to request other switch modules to insert a routing entry learned by the first switch module. In some embodiments, routing entries are invalidated over time or "aged out" of the routing table based on a predetermined aging policy. In such embodiments, the synchronize-refresh indication is sent by the first switch module to request other switch modules to reset any aged or stale status of a specific routing entry or to reduce an extent to which a specific routing entry is considered to be aged or stale. The specific routing entry may be identified by a MAC address. The synchronize-invalidate indication is sent by the first switch module to request other switch modules to invalidate a specific routing entry in the routing table.

As described above, in one embodiment, when the first switch module does not find any routing entry for a source address of an ingress frame, the first switch module learns the source address and then sends a synchronize-insert indication to the other switch modules. Because the other switch modules also do not have any routing entry for the source address, at least in some embodiments, any deliberate delay with which synchronize-insert indication is sent to the other switch modules is minimized or at least reduced, to facilitate timely creation of the routing entries for the source address in the other switch modules.

In the particular example shown in FIG. 4, a synchronize-insert frame is generated to request the other switch modules $250_{2-3}$ to create the corresponding routing entry for the source address in the routing tables $404_{2-3}$ of the switch modules $250_{2-3}$. The synchronization frames are shown as frames 408, 410. The corresponding routing entries are generated based on routing information obtained by the switch module $250_1$. In other words, the switch modules $250_{2-3}$ do not need to flood the network with frames to generate the routing entries. Further, code at an abstraction layer above the network adapter $115_3$ generates a response frame to be sent to the network adapter $115_1$.

At least in some embodiments, the switch modules $250_{1-3}$ are configured to generate other different types of frames to facilitate synchronizing the routing tables $404_{1-3}$, such as synchronize-refresh frames and invalidation frames. Further, in some embodiments, the operations performed by the switch modules are implemented in the form of hardware state machines within the switch modules, where the hardware state machines are configured to detect the occurrence of predefined events in the operation of the switch modules and generate appropriate synchronization indications.

By synchronizing the routing tables using the techniques disclosed herein, the distributed network switch may switch network traffic more efficiently in some cases, at least relative to alternative approaches. One example of an alternative approach is multiple standalone switches, where each switch includes a control point and a routing table, and where each switch has a domain scope of only the respective switch. On the other hand, embodiments disclosed herein relate to a single, distributed network switch that includes multiple routing tables and that is configured to provide increased scalability, granularity, and/or flexibility relative to alternative approaches.

In one embodiment, each routing entry identified by a network address has a corresponding switch module that is designated as the "owner" of the respective routing entry. As used herein, the owner of a routing entry having a given network address refers to the switch module that is configured to learn the given network address. The owner is further configured to send synchronize-refresh indications to other switch modules in the distributed network switch. In one embodiment, at least some routing entries are static routing entries. As used herein, static routing entries refer to routing entries for which synchronize-refresh indications are not sent. A static routing entry may be designated by setting a static bit in a routing entry to one, while a non-static routing entry may be designated by setting the static bit in the routing entry to zero.

In one embodiment, a switch module is designated as the owner of a routing entry upon a first predefined condition being satisfied. Designating the switch module as an owner of the routing entry may include setting an owner bit for the routing entry to one in the routing table of the switch module. In one embodiment, the first predefined condition is satisfied when a source address lookup miss occurs and a routing entry for the source address is generated. As used herein, a network address miss refers to the network address not being found in the routing table during a lookup. The first predefined condition may also be satisfied when a source address hit occurs but one or more predefined attributes in the routing entry, such as route type or path, does not match information from the ingress port on which the frame is received. As used herein, a network address hit refers to the network address being found in the routing table during a lookup. The one or more predefined attributes not matching the information from the ingress port may also be referred to as network address movement.

In one embodiment, a switch module is designated as a non-owner of a routing entry upon a second predefined condition being satisfied. Designating the switch module as a non-owner of the routing entry may include setting the owner bit for the routing entry to zero in the routing table of the switch module. In one embodiment, the second predefined condition is satisfied when an operation to insert a routing entry in the routing table misses and does not specify to designate the switch module as the owner. The second predefined condition may also be satisfied upon receiving one or more predetermined synchronization indications, such as a synchronize-insert or synchronize-refresh indication. Where the operation to insert the routing entry in the routing table hits and the operation does not specify to designate the switch module as the owner, the second predefined condition may also be satisfied if either a route type mismatch or a path mismatch occurs. As used herein, a mismatch refers to an attribute of an inserted routing entry not matching the routing information previously obtained for a given network address.

In one embodiment, the synchronize-refresh indications are used in conjunction with the aging policy described above. In one embodiment, when a refresh operation identifies an entry with owner bit set to one and a static bit set to zero, the switch module synchronize-refresh indication is sent to other switch modules in the distributed network switch. In some embodiments, to reduce the count of synchronize-refresh indications sent in the distributed network switch, the sending of one or more synchronize-refresh indications may be delayed to combine the synchronize refresh indications with one or more subsequent synchronize-refresh indications. For example, a combined indication may be sent that specifies to refresh routing entries for multiple network addresses.

In one embodiment, the distributed network switch implements the aging policy as follows. Each routing entry may include an age attribute that specifies an extent to which the respective routing entry is considered to have aged or to be stale. In some embodiments, the age attribute may be stored as an age bit in the routing entry. Both owners and non-owners of a routing entry identified by a specific network address may age the routing entry in the respective routing tables of the owners and non-owners. In some embodiments, aging is applied to non-static entries only. The age bit of a routing entry may be set to one when a predefined condition is satisfied, such as when the age bit is zero and an operation reads, inserts, or updates the routing entry. A routing entry may be invalidated when its age bit is one and an operation reads, inserts, or updates, the routing entry. The age bit of a routing entry may be set to zero when the routing entry is inserted, e.g., responsive to synchronization indication or from the receiving path of a bridge element. The age bit of a routing entry may be reset to zero when a source address lookup hit occurs from the receiving path of a bridge element. The aging policy may also be tailored to suit the needs of a particular case.

In one embodiment, a switch module may optionally be configured to send a synchronize-invalidate indication when the switch module determines that a routing entry that the switch module owns is no longer valid, e.g., the routing entry has aged out of the routing table. The synchronize-invalidate indication requests other switch modules to invalidate corresponding routing entries, without regard to the aging policies of the other switch modules. Doing so may invalidate the routing entry across multiple switch modules more quickly in some cases, at least relative to alternative approaches that allow the routing entry to be aged out independently by each switch module.

Figure 5:
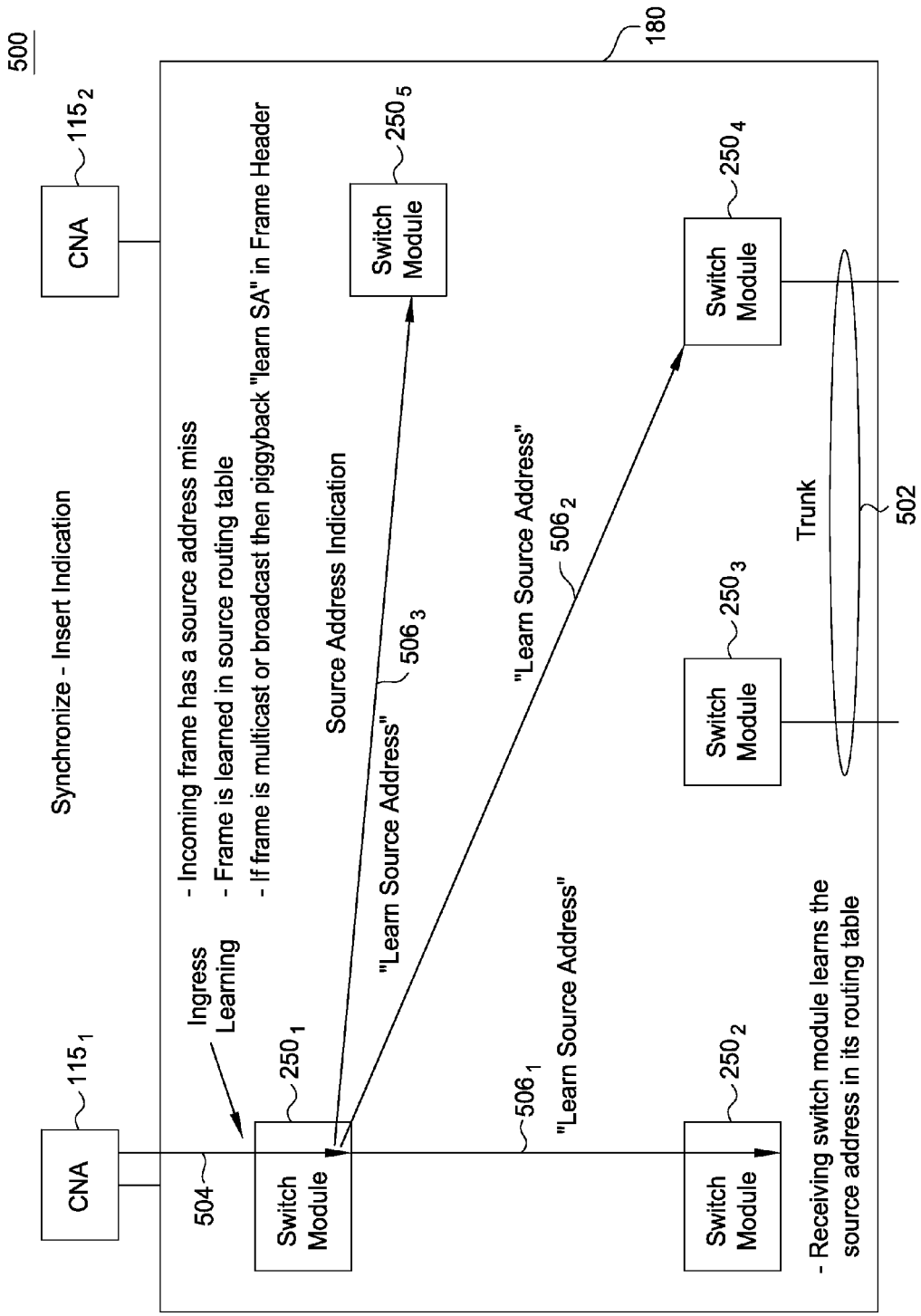
FIG. 5 is a data flow diagram illustrating a method for sending a synchronize-insert indication as part of a preexisting frame, according to one embodiment of the invention.

FIG. 5 is a data flow diagram 500 illustrating a method for sending a synchronize-insert indication as part of a preexisting frame or a copy thereof, according to one embodiment of the invention. The preexisting frame may be an ingress frame that is to be broadcast or multicast to other switch modules. As shown, the switch module $250_1$ receives an ingress frame, as represented by an arrow 504 in FIG. 5. If there is a source address miss, if the switch module $250_1$ generates a routing entry for the source address, and if the ingress frame is a broadcast or multicast frame, then the switch module $250_1$ updates a frame header of the ingress frame to store the synchronize-insert indication and then broadcasts (or multicasts) the ingress frame to other switch modules $250_{2-5}$, as represented by arrows $506_{1-3}$ in FIG. 5. In other words, the synchronize-insert indication may be "piggybacked" on top of other frames to be sent to the switch modules—rather than being sent as a standalone frame to the switch modules.

In one embodiment, each switch module receiving the frames may detect the presence of the synchronize-insert indication in the frame and generate the corresponding routing entry in the routing table of the respective switch module. In some embodiments, the routing entry may be generated by sending a request via a parser of the receiving path of the switch module to a component managing the routing table, using a predetermined interface, e.g., the interface for sending synchronization indications. In some embodiments, links to some switch modules, e.g., the switch modules $250_{3-4}$, may also be combined to form a logical trunk 502.

Figure 6A:
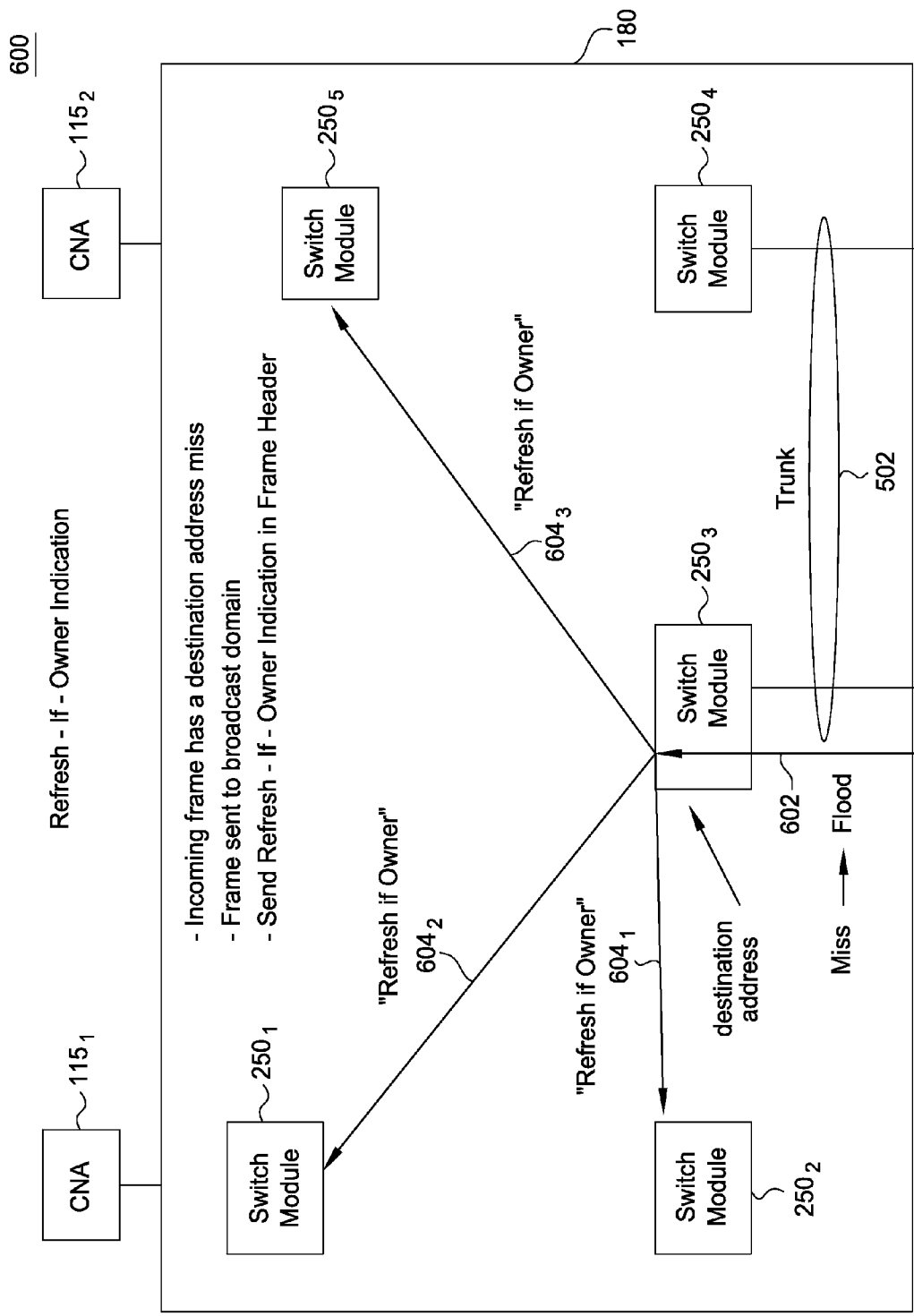

FIGS. 6A-6B are data flow diagrams 600, 650 illustrating a method for sending a refresh-if-owner indication as part of a preexisting frame or a copy thereof, according to one embodiment of the invention. As shown in FIG. 6A, the switch module $250_3$ receives an ingress frame, as represented by an arrow 602. If there is a destination address miss, then the switch module 2503 updates a frame header of the ingress frame to store the refresh-if-owner indication and then broadcasts the ingress frame to other switch modules $250_{1,2-5}$. Each switch modules $250_{1, 2-5}$ receiving the ingress frame may detect the presence of the refresh-if-owner indication in the frame and, in response, broadcast a synchronize-refresh indication if the respective switch module determines that it is the owner of the destination address of the ingress frame. The broadcast synchronize-refresh indication is represented as arrows $606_{1-4}$ in FIG. 6B. In effect, each corresponding routing entry of a given network address is refreshed based on the routing entry stored at the owning switch module. If a routing entry is invalid at any switch module, a valid routing entry is inserted as a result.

FIG. 7 is a table 700 showing example message formats for synchronization indications, according to one embodiment of the invention. As shown, the table 700 includes a message type attribute 702, an Ethernet header attribute 704, a control operation type attribute 706, and formatting information 708 for bytes twenty through sixty-three. The message types include a synchronize-refresh message 716 and a synchronize-invalidate message 718, which include an identical Ethernet header attribute 704 and a different control operation type attribute 706. The formatting information 708 specifies route information, entry keys for the routing tables, and cyclic redundancy check (CRC) data. The formatting information 708 may also include padded values for conforming to the message formats. In one embodiment, a round-robin scheme is used to determine which bridge element of a switch module broadcasts each synchronization indication. The message formats may also be tailored to suit the needs of a particular case.

Figure 8:
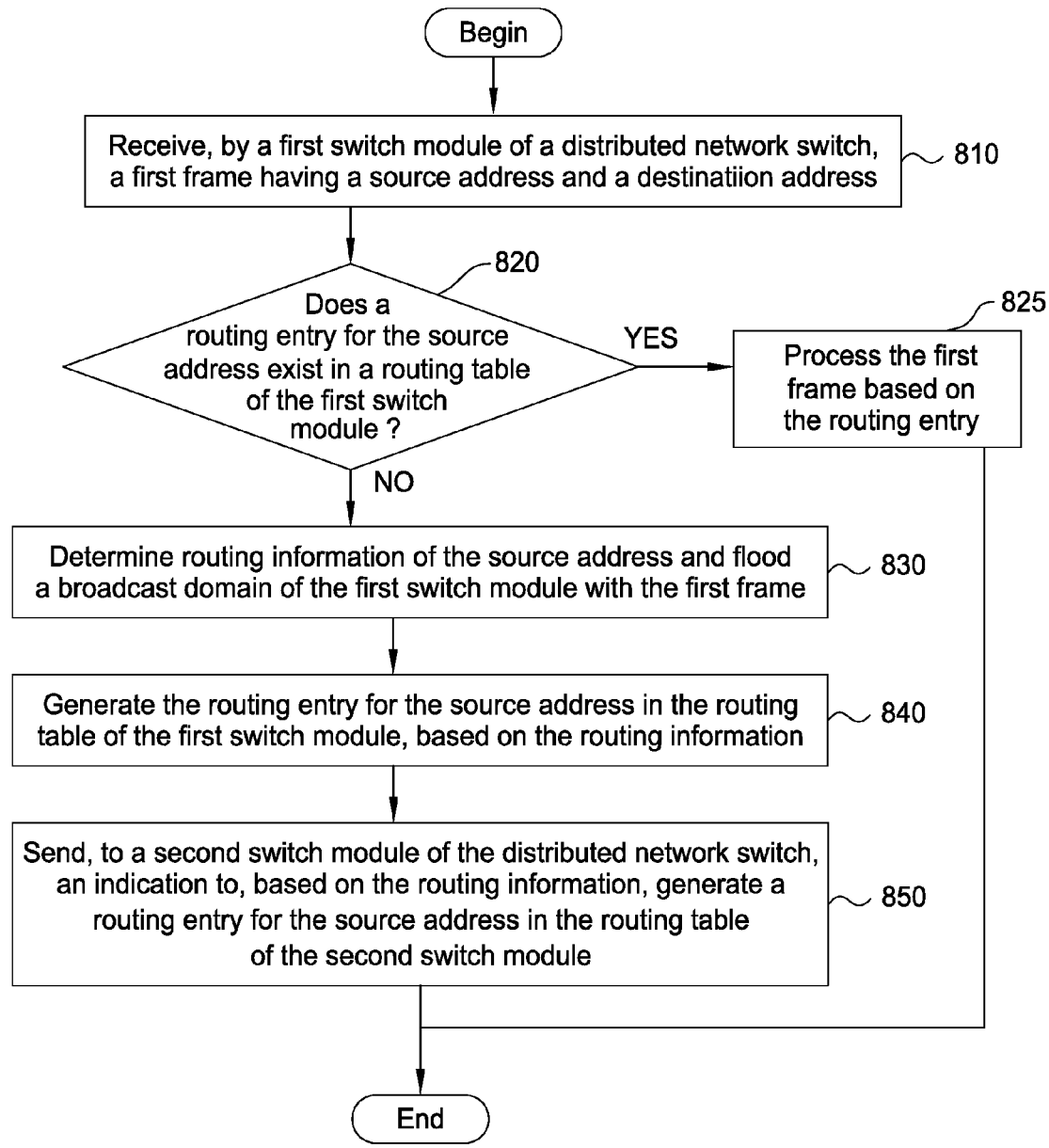
FIG. 8 is a flowchart depicting a method for synchronizing routing tables for a source address in a distributed network switch, according to one embodiment of the invention.

FIG. 8 is a flowchart depicting a method 800 for synchronizing routing tables for a source address in a distributed network switch, according to one embodiment of the invention. As shown, the method 800 begins at step 810, where a first switch module of the distributed network switch receives a first frame having a source address and a destination address. At step 820, the first switch module determines whether a routing entry exists for the source address in a routing table of the first switch module. If so, the first switch module processes the first frame based on the routing entry (step 825).

Otherwise, the first switch module determines routing information for the first frame and floods a broadcast domain of the first switch module with the first frame (step 830). The first switch module then generates the routing entry for the source address in the routing table, based on the routing information (step 840). The first switch module then sends a synchronize-insert indication to at least a second switch module of the distributed network switch (step 850). The synchronize-insert indication requests the second switch module to generate a routing entry for the source address in a routing table of the second switch module and based on the routing information provided by the first switch module. After the step 825 or the step 850, the method 800 terminates.

Figure 9:
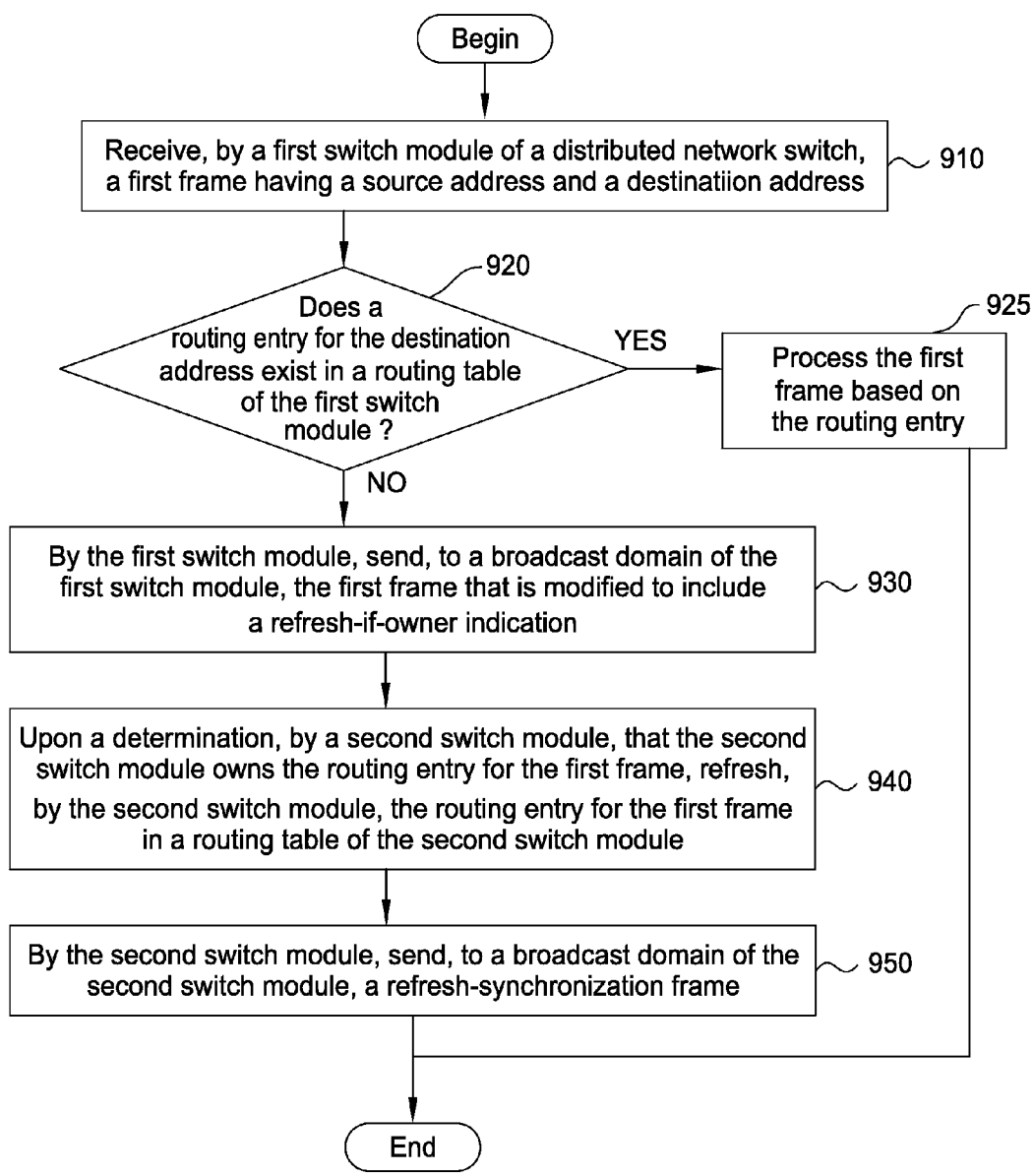
FIG. 9 is a flowchart depicting a method for synchronizing routing tables for a destination address in a distributed network switch, according to one embodiment of the invention.

FIG. 9 is a flowchart depicting a method 900 for synchronizing routing tables for a destination address in a distributed network switch, according to one embodiment of the invention. As shown, the method 900 begins at step 910, where a first switch module of the distributed network switch receives a first frame having a source address and a destination address. At step 920, the first switch module determines whether a routing entry exists for the destination address in a routing table of the first switch module. If so, the first switch module processes the frame based on the routing entry (step 925).

Otherwise, the first switch module sends, to a broadcast domain of the first switch module, a copy of the first frame that is modified to include a refresh-if-owner indication in the frame header (step 930). Upon a determination by a second switch module that the second switch module owns the routing entry for the destination address of the first frame, the second switch module refreshes the destination address of the first frame in a routing table of the second switch module (step 940). The second switch module then sends a refresh-synchronization frame to a broadcast domain of the second switch module (step 950). In response to the refresh-synchronization frame, each switch module in the broadcast domain may, for example, reset an aged bit of the corresponding routing entry to zero, insert a corresponding routing entry, etc. After the step 925 or the step 950, the method 900 terminates.

Embodiments of the invention provide techniques for routing table synchronization for a distributed network switch. In one embodiment, a switch module receives a first frame having a source address and a destination address. If the switch module does not find any routing entry for the source address in a routing table of the switch module, the switch module determines routing information for the source address and generates a routing entry in the routing table, based on the routing information. The switch module sends an indication to one or more other switch modules, to request corresponding routing entries to be generated in the routing tables of the one or more other switch modules based on the routing information. Accordingly, the distributed network switch may operate more efficiently at least in some cases.

While the foregoing is directed to embodiments of the present invention, other and further embodiments of the invention may be devised without departing from the basic scope thereof, and the scope thereof is determined by the claims that follow.

What is claimed is:

1. A computer-implemented method for routing table synchronization in a distributed network switch that includes a first switch module and a second switch module, the computer-implemented method comprising:

receiving, by the first switch module, a first frame having a source address and a destination address, wherein each switch module comprises a plurality of bridge elements and a routing table, wherein the routing table in each switch module is shared among the plurality of bridge elements in the respective switch module;

upon determining that the routing table of the first switch module does not include any routing entry for the source address:

generating a routing entry for the source address in the routing table of the first switch module, based on routing information determined for the source address; and sending, to the second switch module, an indication to generate a corresponding entry for the source address in the routing table of the second switch module; and upon determining, by operation of one or more computer processors, that the routing table of the first switch module does not include any routing entry for the destination address:

generating a routing entry for the destination address in the routing table of the first switch module, based on routing information determined for the destination address; and sending, to the second switch module, an indication to perform a routing entry refresh for the destination address in the routing table of the second switch module, wherein the routing entry refresh is performed only upon a determination that the second switch module is designated as owner of the destination address, wherein the routing entry for the destination address is generated by the owner of the destination address, prior to any non-owner of the destination address generating a corresponding routing entry for the destination address.

2. The computer-implemented method of claim 1, wherein a broadcast domain of the first switch module is flooded with the first frame, and wherein the routing table of the second switch module is updated to include the corresponding entry for the source address, without flooding a broadcast domain of the second switch module with any response frame.

3. The computer-implemented method of claim 2, wherein a response frame from the destination address and destined for the source address is received by the second switch module subsequent to the second switch module being updated to include the corresponding entry for the source address.

4. The computer-implemented method of claim 3, further comprising:

receiving, by the first switch module, the response frame from the second switch module; and sending, by the first switch module, the response frame to the source address.

5. The computer-implemented method of claim 1, wherein the first frame comprises at least one of a multicast frame and a broadcast frame, wherein the first switch module is configured to store, in at least one bit of a frame header of the first frame, the indication to generate the corresponding entry, and wherein the indication to generate the corresponding entry is sent to the second switch module without any synchronization frame other than the first frame to be sent.

6. The computer-implemented method of claim 1, wherein the routing table is managed according to one or more aging rules.

7. The computer-implemented method of claim 6, wherein the first switch module is configured to send, to one or more other switch modules, an indication to invalidate a routing entry for a specified network address.

8. The computer-implemented method of claim 7, wherein performing the routing entry refresh for the destination address comprises at least one of generating the routing entry of the destination address or reducing an extent to which the routing entry of the destination address is considered to have aged.

9. The computer-implemented method of claim 8, wherein the routing entry for the network address in each switch module includes a flag designating whether the respective switch module is an owner of the routing entry.

10. The computer-implemented method of claim 9, wherein performing the routing entry refresh for the destination address comprises at least one of: (i) generating a routing entry for the destination address in the routing table of second switch module or (ii) reducing an extent to which the routing entry of the destination address in the routing table of the second switch module is considered to have aged.

11. The computer-implemented method of claim 10, wherein a broadcast domain of the first switch module is flooded with the first frame, wherein the routing table of the second switch module is updated to include the corresponding entry for the source address, without flooding a broadcast domain of the second switch module with any response frame.

12. The computer-implemented method of claim 11, wherein a response frame from the destination address and destined for the source address is received by the second switch module subsequent to the second switch module being updated to include the corresponding entry for the source address.

13. The computer-implemented method of claim 12, further comprising:
receiving, by the first switch module, the response frame from the second switch module; and
sending, by the first switch module, the response frame to the source address.

14. The computer-implemented method of claim 13, wherein the first switch module is configured to store, in at least one bit of a frame header of the first frame, the indication to generate the corresponding entry, wherein the indication to generate the corresponding entry is sent to the second switch module without any synchronization frame other than the first frame to send, wherein the first frame comprises, in respective instances, a multicast frame and a broadcast frame.

15. The computer-implemented method of claim 14, wherein performing the routing entry refresh for the destination address comprises, in respective instances: (i) generating the routing entry for the destination address in the routing table of second switch module and (ii) reducing an extent to which the routing entry of the destination address in the routing table of the second switch module is considered to have aged.

16. The computer-implemented method of claim 1, wherein being designated as the owner of the destination address comprises being configured to first generate the routing entry for the destination address, prior to any other switch module generating a corresponding routing entry for the destination address.

17. The computer-implemented method of claim 1, wherein the routing entry for the network address in each switch module includes a flag designating whether the respective switch module is an owner of the routing entry.

18. The computer-implemented method of claim 1, wherein performing the routing entry refresh for the destination address comprises generating a routing entry for the destination address in the routing table of second switch module.

19. The computer-implemented method of claim 1, wherein performing the routing entry refresh for the destination address comprises reducing an extent to which a routing entry of the destination address in the routing table of the second switch module is considered to have aged.

20. The computer-implemented method of claim 1, wherein the first frame comprises a multicast frame or a broadcast frame.

* * * * *